United States Patent

Nakagawa

[19]

[11] Patent Number: 6,021,159
[45] Date of Patent: Feb. 1, 2000

[54] CIRCUIT FOR MEASURING TRANSMISSION QUALITY OF DEMODULATED DIGITAL SIGNAL TRANSMITTED UNDER CARRIER MODULATION TRANSMISSION SYSTEM

[75] Inventor: Sumio Nakagawa, Tokyo, Japan

[73] Assignee: Ikegami Tsushinki Co., Ltd., Tokyo, Japan

[21] Appl. No.: 08/994,016

[22] Filed: Dec. 18, 1997

[30] Foreign Application Priority Data

May 28, 1997 [JP] Japan .................................. 9-138319

[51] Int. Cl.[7] .............................. H04B 17/00; H03D 3/00
[52] U.S. Cl. ........................ 375/224; 329/309; 455/226.1
[58] Field of Search .................... 375/224, 227, 375/346, 338, 332, 365; 455/450, 62, 226.1; 348/554, 555; 329/304, 309

[56] References Cited

U.S. PATENT DOCUMENTS

| | | | |
|---|---|---|---|
| 4,696,957 | 9/1987 | Otani | 455/226 |
| 5,202,643 | 4/1993 | Sato | 329/309 |
| 5,317,599 | 5/1994 | Obata | 375/332 |
| 5,450,623 | 9/1995 | Yokoyama et al. | 455/226.1 |

FOREIGN PATENT DOCUMENTS 5-113459  5/1993  Japan .

*Primary Examiner*—Chi H. Pham
*Assistant Examiner*—Khai Tran
*Attorney, Agent, or Firm*—Oliff & Berridge, PLC

[57] ABSTRACT

A circuit for measuring a carrier-to-noise ratio or a bit error rate of demodulated I and Q digital signals obtained by demodulating an input carrier wave which is modulated and transmitted under a carrier modulation transmission system including a discriminating circuit for producing a discrimination signal each time the demodulated digital signal comes within predetermined windows set on a signal space of the I and Q signals, a counter for counting the discrimination signals during a predetermined time interval, and a calculating circuit for calculating a carrier-to-noise ratio or bit error rate in accordance with a count value with reference to a previously stored relationship between count values and carrier-to-noise ratios or bit error rates.

11 Claims, 5 Drawing Sheets

FIG_2
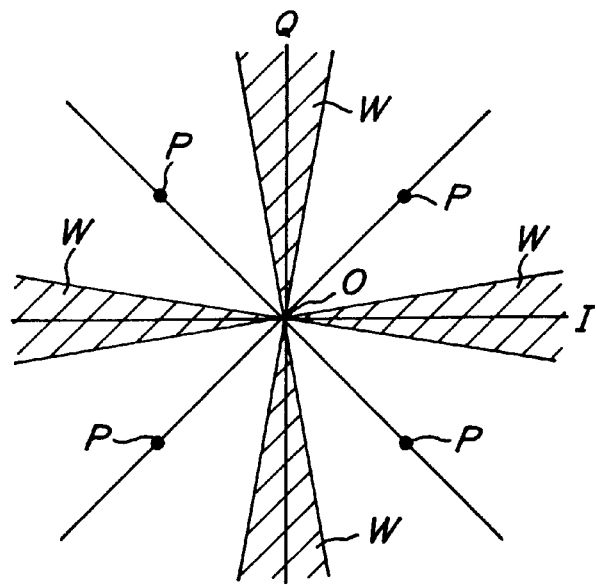
FIG_3
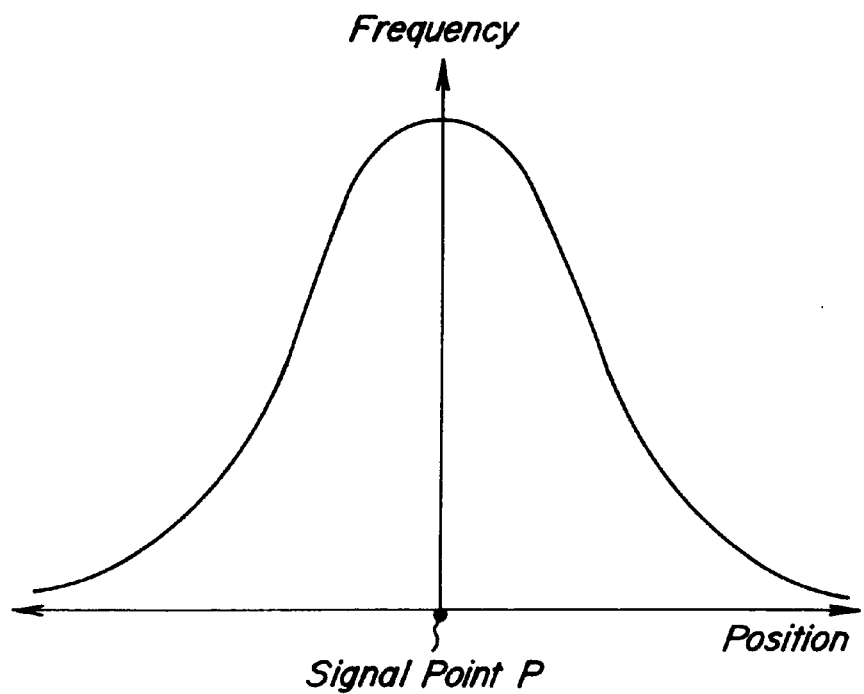

FIG_5
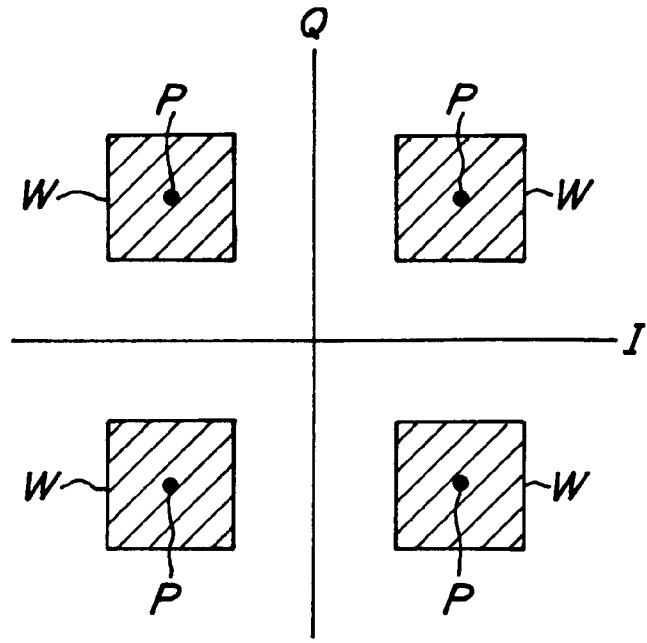
FIG_6
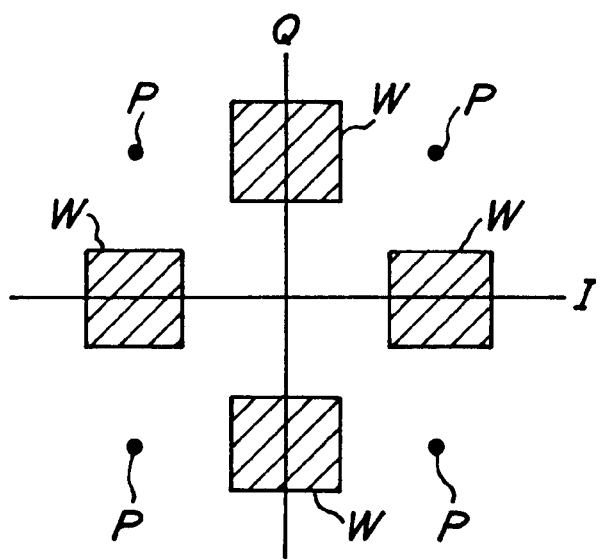

FIG_7
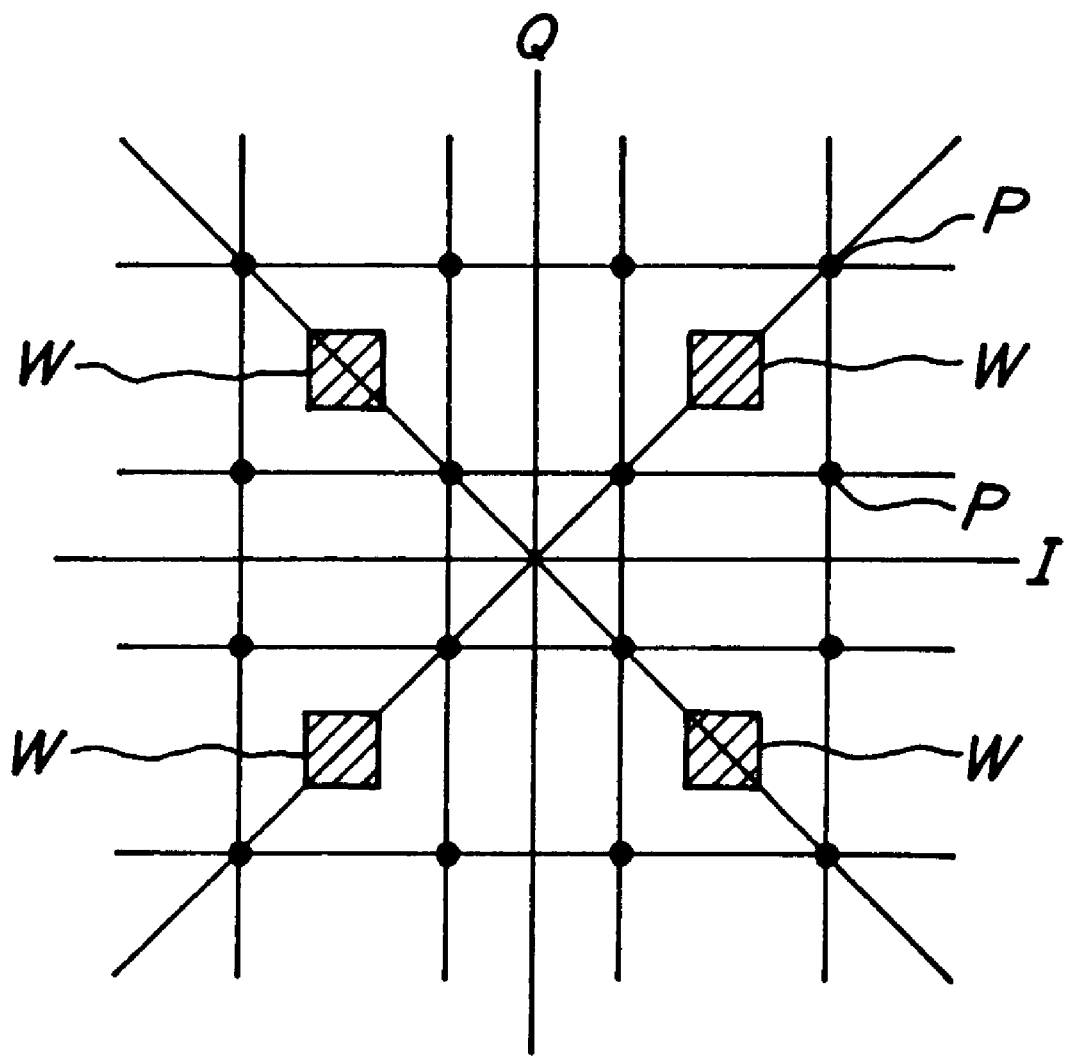

CIRCUIT FOR MEASURING TRANSMISSION QUALITY OF DEMODULATED DIGITAL SIGNAL TRANSMITTED UNDER CARRIER MODULATION TRANSMISSION SYSTEM

BACKGROUND OF THE INVENTION

Field of the Invention

This invention relates to a circuit for measuring a transmission quality of a digital signal reproduced in a digital demodulator, in which an input carrier wave modulated and transmitted under a carrier modulation transmission system is received and is demodulated to reproduce an original digital signal. The present invention is preferably applied to a digital demodulator, in which a phase modulated carrier wave (Phase Shift Keying) or quadrature amplitude modulated (QAM) carrier wave is subjected to a quadrature synchronous detection to reproduce an original digital signal. In particular, the circuit according to the present invention is designed to measure a carrier-to-noise ratio (CN ratio) or a bit error rate (BER) of the reproduced digital signal.

In a digital demodulator for reproducing an original digital signal by demodulating a received input carrier wave which is modulated under the carrier modulation transmission system, in order to detect the CN ratio, a carrier power is generally measured. To this end, the non-modulated carrier has to be transmitted or the measurement has to be effected for a relatively long time to detect a peak of the carrier wave as the power of the carrier. Therefore, it is impossible to perform the measurement of the CN ratio on a real time. Furthermore, in order to conduct such an measurement, the apparatus is liable to become complicated and expensive, because it is necessary to provide filters for extracting the carrier and noise, power meter and spectrum analyzer.

Moreover, in order to measure the BER, the transmission of the information has to be interrupted or a specific bit array has to be inserted within an information bit stream. This apparently results in an undesired decrease in the transmission efficiency. Further, when BER is small, the measurement requires a quite long time.

In Japanese Patent Publication Kokai Hei 5-113459, there is described a known CN measuring circuit which can remove some of the above explained drawbacks. This known CN measuring circuit is based on a recognition that the conventional digital demodulator for demodulating the modulated carrier wave usually includes an error correction circuit. Then, the number of errors of the digital signal or the number of error correcting operations or the number of data interpolating operations occurring within a predetermined time period is counted to derive an error count, and a carrier-to-noise ratio is calculated from the thus obtained error count with reference to a previously determined and stored relationship between various error counts and carrier-to-noise ratios.

In the known transmission quality measuring circuit described in the above mentioned Japanese Patent Publication Kokai Hei 5-113459, it is possible to measure the CN ratios substantially on the real time and can be constructed simple in construction and less expensive in cost, because it is no more required to provide the power meter and filters. However, since the CN ratio is estimated on the basis of the number of errors of the digital signal or the number of error correcting operations or the number of data interpolating operations occurring within the predetermined time period, when the CN ratio is relatively small, a reliable measurement could not be carried out unless said time period is set to a relatively long time. Then, it is no more possible to perform the measurement on the real time. For instance, if an error rate for a transmission rate of $10^6$ symbols per second is assumed to $10^{-10}$, an error of one symbol will occur for an average time period of ten thousands ($10^4$) seconds. Then, in order to measure the CN ratio under such a condition, it is necessary to set the time period to an extremely long time period. Moreover, the known measuring circuit operates on the basis of the error detection or error correction, the number of redundant bits has to be increased for the correction, and thus the transmission efficiency is liable to be decreased.

SUMMARY OF THE INVENTION

The present invention has for its object to provide a novel and useful circuit for measuring a transmission quality of a digital signal, in which the above explained demerits of the known circuits and carrier-to-noise ratio and bit error rate can be measured on the real time even under such a condition that a frequency of errors is low.

It is another object of the invention to provide a circuit for measuring a transmission quality of a digital signal, which is not based on a frequency of errors or error corrections or data interpolations and can avoid undesired decrease in the transmission efficiency.

According to the invention, a circuit for measuring a transmission quality of a digital signal, in which an input carrier wave modulated and transmitted under a carrier modulation transmission system is received and is demodulated to reproduce a demodulated digital signal comprises:

a timer means for setting a predetermined time interval;

a discriminating means for generating a discrimination output signal each time the demodulated digital signal comes within at least one window which is previously determined in a signal space of the demodulated digital signal;

a counting means for counting the number of said discrimination output signals within said predetermined time interval to derive a count value; and a calculating means for calculating a transmission quality of the demodulated digital signal in accordance with said count value derived from said counting means with reference to a previously obtained relationship between count values and degrees of transmission quality.

In a preferable embodiment of the transmission quality measuring circuit according to the invention, said calculating means is constructed such that a carrier-noise ratio is calculated in accordance with a previously obtained and stored relationship between count values and carrier-noise ratios.

In another preferable embodiment of the transmission quality measuring circuit according to the invention, said calculating means is constructed such that a bit error rate is calculated in accordance with a previously obtained and stored relationship between count values and bit error rates.

In the transmission quality measuring circuit according to the invention, said window may be set to such a region in the signal space including a position at which an original digital signal exists or a region which does not includes such a signal position. Further, the number of the windows may be set arbitrarily.

BRIEF DESCRIPTION OF THE DRAWINGS

FIG. 2 is a diagram representing an arrangement of windows set in a signal space;

FIG. 3 is a graph expressing a relationship between the signal point and a frequency of occasions in which the demodulated signal appears at respective signal positions;

FIG. 5 is a diagram depicting an embodiment of the arrangement of windows;

FIG. 6 is a diagram showing another embodiment of the arrangement of windows; and FIG. 7 is a diagram illustrating another embodiment of the arrangement of windows.

DESCRIPTION OF THE PREFERRED EMBODIMENTS

Figure 1:
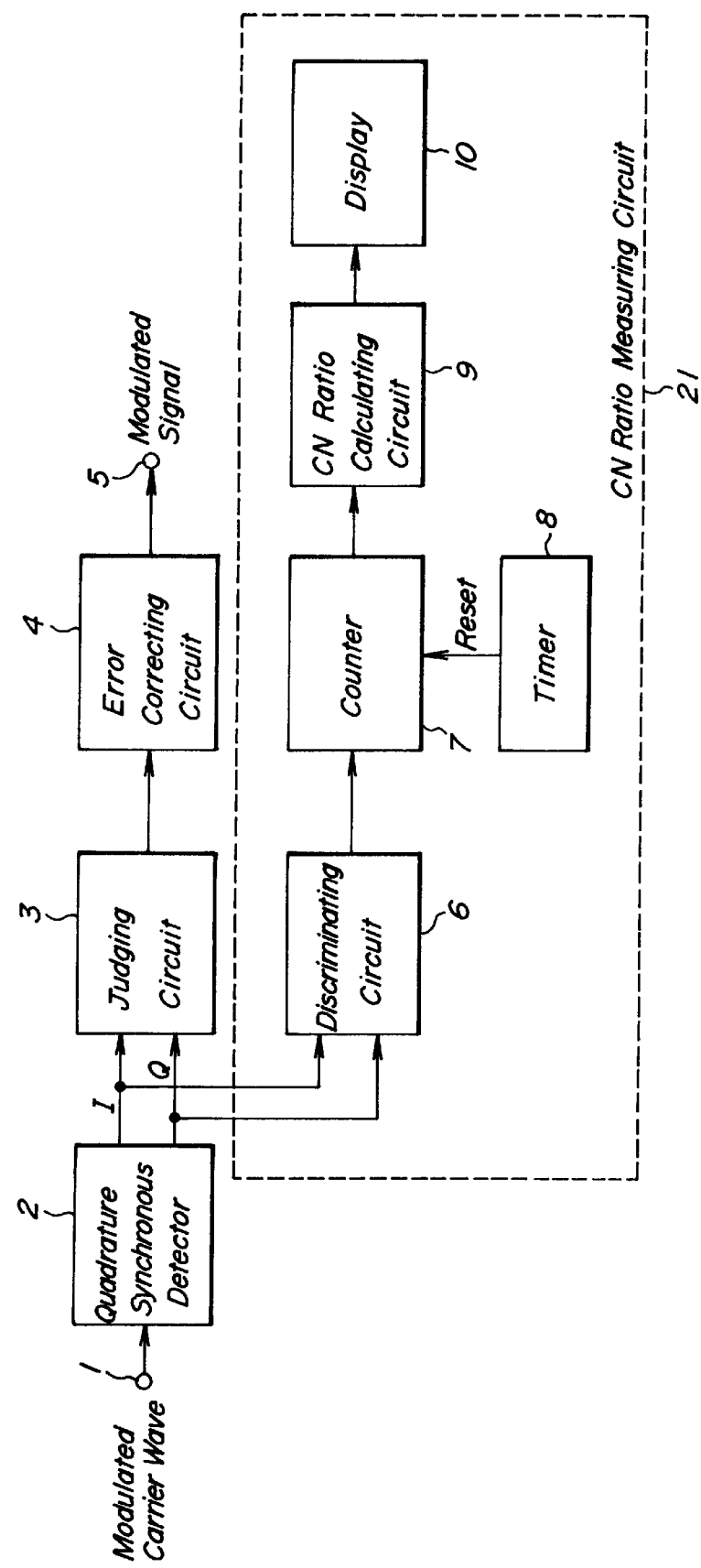
FIG. 1 is a block diagram showing an embodiment of the transmission quality measuring circuit according to the invention.

FIG. 1 is a block diagram showing an embodiment of the transmission quality measuring circuit according to the invention, which is installed in a digital demodulator. An input carrier wave which is modulated and transmitted under a carrier modulation transmission system is received by an antenna 1. In the present embodiment, the input carrier wave is transmitted under a carrier modulation transmission system of QPSK (quadrature phase shift keying) which has been used as one of carrier modulation transmission systems for use in satellite broadcastings. The input carrier wave is supplied to a quadrature synchronous detector 2 and mutually orthogonal I and Q signal are demodulated. These I and Q signals are supplied to a sign judgement circuit 3 to judge their signs. The thus judged signs are supplied to an error detection circuit 4 and possible error is corrected. In this manner, an original digital signal is reproduced from the corrected I and Q signals and is supplied to an output terminal 5. It should be noted that the construction and operation of the digital demodulator so far explained have been known in the art.

In order to measure a carrier-noise ratio, the I and Q signals demodulated by the quadrature synchronous detector 2 are supplied to a CN ratio measuring circuit 21 according to the invention This CN ratio measuring circuit 21 comprises a discriminating circuit 6 which judges whether or not the demodulated I and Q signals come within predetermined windows set on a signal space of I and Q signals.

FIG. 2 is a diagram depicting the arrangement of windows set on the space of the I and Q signals in the present embodiment. When the input carrier wave has been transmitted without being affected by noise during the transmission, the demodulated I and Q signals come on points P which have specific positional relationship with respect to I and Q axes. However, when the transmission is affected by noise, the demodulated I and Q signals are subjected to interference and do not situate on the points P any more.

FIG. 3 is a graph representing a relationship between the position in the signal space and a frequency of occasions or events in which the demodulated signal falls on respective points. As illustrated in FIG. 3, the frequency becomes maximum at the point P and is gradually decreased in accordance with an increase in a distance from the point P on both sides thereof. In general, the relationship between points of the signal space and the frequency follows the Gaussian distribution. The present invention is based on the recognition of such a fact. In principle, according to the invention, a frequency of occasions in which the demodulated digital signal falls within the predetermined windows is detected and the transmission quality is estimated by measuring a departure of the detected frequency from a predetermined frequency following the Gaussian distribution.

In the present embodiment, as illustrated in FIG. 2, four windows W are set in the space of the I and Q signals. That is to say, a respective window W is set to have a triangular region whose apex situate on an origin 0 of the signal space and whose apex angle extends by about ±30 degrees with respect to the I or Q axis. By setting the windows W on the basis of angular components of the demodulated I and Q signals, the influence on the demodulated signals can be judged directly.

In the discriminating circuit 6, when it is detected that the demodulated digital signal falls within any one of four windows W, the discriminating circuit generates a discrimination signal. The thus generated discrimination signal is supplied to a counter 7 to which is also supplied a reset signal from a timer 8. The timer 8 supplies the reset signal to the counter 7 every time the predetermined number of symbols have been transmitted, i.e. a predetermined time period has elapsed. In the present embodiment, the modulated carrier wave is transmitted at a transmission rate of $10^6$–$10^7$ symbols per second and the timer 8 is constructed to generate the reset signal every time $10^4$ symbols have been transmitted, i.e. 0.5 seconds. Therefore, the counter 7 counts the number of the discrimination signals generated by the discriminating circuit 6 during said time interval of 0.5 seconds.

As stated above, the number of occasions or events in which the demodulated signal comes within the windows W during the predetermined time interval is counted by the counter 7, and a count value of the counter is supplied to a calculating circuit 9. The calculating circuit 9 includes a memory for storing data representing a relationship between count values and carrier-to-noise ratios. In the calculating circuit 9, a carrier-to-noise ratio is calculated in accordance with the count value supplied from the counter 7 with reference to said previously stored data. This may be carried out by, for instance the linear approximation method. In this method, at first, two count values C1 and C2 which are close to the input count value Cx are selected from the stored data are selected. Then, a carrier-to-noise ratio CNx is calculated from the following equation.

$$CNx=(CN2-CN1)/(C2-C1)\cdot Cx-(CN2\cdot C1-CN1\cdot C2)/(C2-C1)$$

The calculated carrier-to-noise ratio CNx is supplied to a display device 10 and is displayed thereon.

Figure 4:
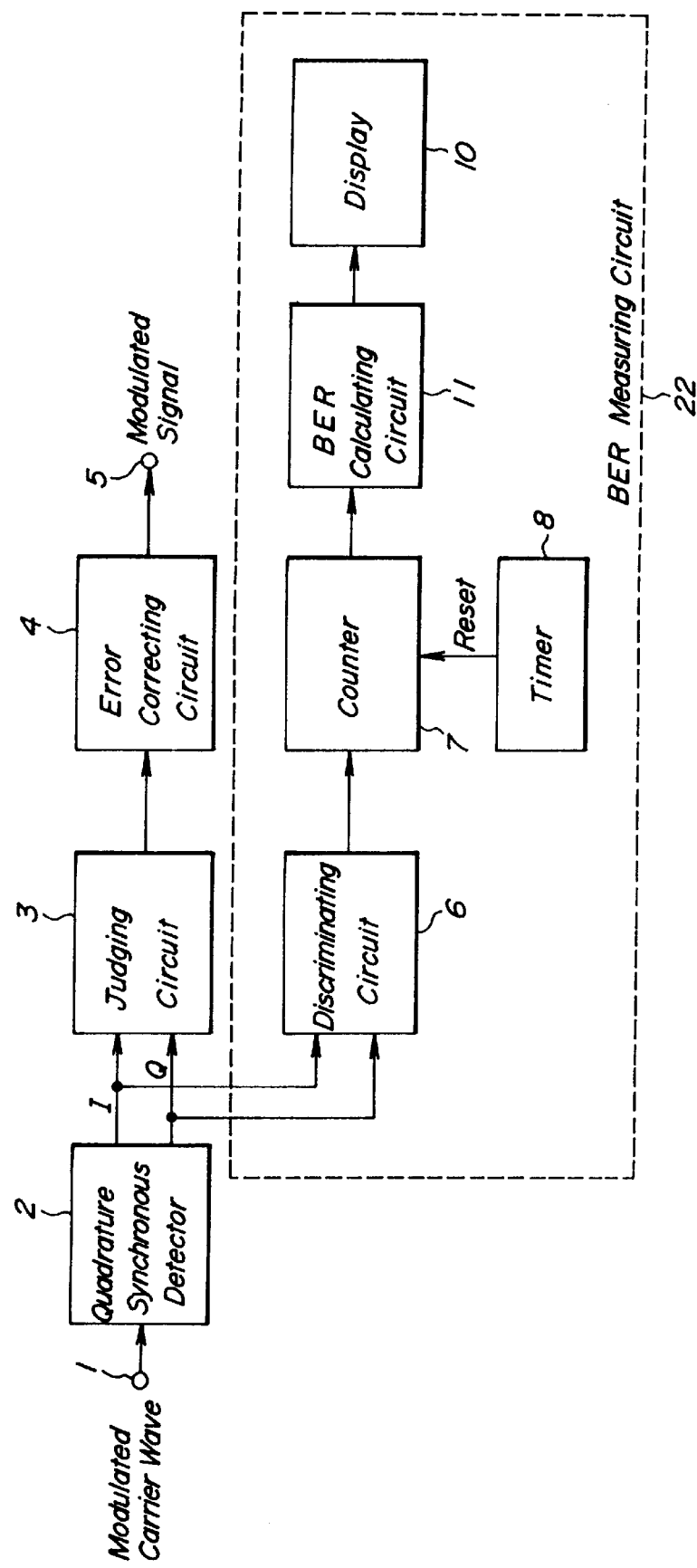
FIG. 4 is a block diagram illustrating another embodiment of the transmission quality measuring circuit according to the invention.

FIG. 4 is a block diagram illustrating another embodiment of the transmission quality measuring circuit according to the invention. In the present embodiment, the bit error rate BER of the demodulated digital signal is measured. In the present embodiment, portions similar to those shown in FIG. 1 are denoted by the same reference numerals used in FIG. 1 and their detailed explanation is dispensed with. The demodulated I and Q signals are supplied to a bit error rate measuring circuit 22, in which the number of events in which the demodulated I and Q signals fall within predetermined windows W is counted during a time period determined by the timer 8 and a count value is supplied from the counter 7 to a bit error rate calculating circuit 11. In the bit error rate calculating circuit 11, a bit error rate is calculated in accordance with the count value with reference to a previously obtained and stored relationship between various count values and bit error rates. Also in the present embodiment, the bit error rate of the demodulated I and Q signals can be measured substantially on the real time.

The present invention is not limited to the above explained embodiments, but many alternations and modifications may be conceived by those skilled in the art within the scope of the invention. For instance, the windows may be set as illustrated in FIGS. 5 and 6. In FIG. 5, four square windows W are set such that each windows contains respective signal points P at its center. In FIG. 6, four square windows W are set in such a manner that they situate at middle points between adjacent signal points P. According to the invention, the number of windows is arbitrary. For instance, in the arrangements of the windows shown in FIGS. 2, 5 and 6, the number of windows may be set to one or two or three.

In the above embodiments, the carrier wave is modulated and transmitted under the quadrature phase modulation (QPSK) system, but the invention may be applied generally to the PSK system including the multi-value PSK system or may be applied to the quadrature amplitude modulation system.

FIG. 7 is a diagram showing an embodiment of the arrangement of windows for the application to the 16 QAM system. Four square windows W are set such that each windows are surrounded by four signal points P in respective quadratures.

As explained above in detail, according to the invention, the number of occasions or events in which the demodulated digital signal falls within one or more windows previously set on the signal space is counted for a predetermined time period, and then carrier-to-noise ratio or bit error rate is calculated on the basis of the count value with reference to a previously stored relationship between various count values and carrier-to-noise ratio or bit error rates. Therefore, the transmission quality measuring circuit according to the invention can be made simpler in construction and less expensive than a known measuring circuit. Further, since the measurement can be performed without interrupting the ordinary data transmission, any decrease in the transmission efficiency can be avoided. Moreover, even if the error is small, the carrier-to-noise ratio and bit error rate can be measured accurately on a real time.

What is claimed is:

1. A circuit for measuring a transmission quality of a digital signal, in which an input carrier wave modulated and transmitted under a carrier modulation transmission system is received and is demodulated to reproduce a demodulated digital signal comprising:
   a timer means for setting a predetermined time interval;
   a discriminating means for generating a discrimination output signal each time the demodulated digital signal comes within at least one window which is previously determined in a signal space of the demodulated digital signal;
   a counting means for counting the number of said discrimination output signals within said predetermined time interval to derive a count value; and
   a calculating means for calculating a transmission quality of the demodulated digital signal in accordance with said count value derived from said counting means with reference to a previously obtained relationship between count values and degrees of transmission quality.

2. A circuit according to claim 1, wherein said calculating means is constructed such that a carrier-to-noise ratio is calculated in accordance with the count value supplied from the counting means with reference to a previously determined relationship between count values and carrier-to-noise ratios.

3. A circuit according to claim 1, wherein said calculating means is constructed such that a bit error rate is calculated in accordance with the count value supplied from the counting means with reference to a previously determined relationship between count values and bit error rates.

4. A circuit according to claim 2, wherein a plurality of windows are set on a signal space of mutually orthogonal I and Q signals which are demodulated by a quadrature synchronous detection.

5. A circuit according to claim 4, wherein each of said windows set on the signal space of the demodulated digital signal does not contain a signal point on the signal space of the original digital signal.

6. A circuit according to claim 5, wherein four windows are set on I and Q axes of the signal space of the I and Q demodulated signals.

7. A circuit according to claim 6, wherein each of said four windows is formed to have a triangular shape whose apex on an origin of the signal space of the I and Q demodulated signals and whose apex angle is about 60 degrees.

8. A circuit according to claim 6, wherein each of said four windows situates on a line connecting adjacent signal points.

9. A circuit according to claim 4, wherein said window set on the signal space of the demodulated digital signal contains a signal point on the signal space of the original digital signal.

10. A circuit according to claim 9, wherein four windows are set on the signal space of the I and Q demodulated signals such that each of the four windows contains respective one of four signal points.

11. A circuit according to claim 4, wherein the carrier wave is modulated by 16 quadrature amplitude modulation (16QAM) system and four windows are set on the signal space of the demodulated I and Q signals such that each of said four windows is included within a region surrounded by four signal points in respective quadratures.

* * * * *